United States Patent
Urushidani et al.

[11] Patent Number: 5,121,597
[45] Date of Patent: Jun. 16, 1992

[54] GAS TURBINE COMBUSTOR AND METHODD OF OPERATING THE SAME

[75] Inventors: Haruo Urushidani; Seiichi Kirikami; Isao Sato; Nobuo Shimizu; Osamu Arai; Akira Shimura; Michio Kuroda; Tsuguaki Koga, all of Hitachi; Tadashi Kurokawa, Katsuta; Yoji Ishibashi; Katsukuni Hisano, both of Hitachi, all of Japan

[73] Assignee: Hitachi, Ltd., Tokyo, Japan

[21] Appl. No.: 470,596

[22] Filed: Jan. 26, 1990

[30] Foreign Application Priority Data

Feb. 3, 1989 [JP] Japan ................... 1-23884

[51] Int. Cl.⁵ .......................... F02C 7/26; F02G 3/00
[52] U.S. Cl. ................... 60/39.06; 60/733; 60/740; 60/747
[58] Field of Search .............. 60/39.06, 733, 740, 60/732, 747

[56] References Cited

U.S. PATENT DOCUMENTS

| | | | |
|---|---|---|---|
| 4,173,118 | 11/1979 | Kawaguchi | 60/39.65 |
| 4,292,801 | 10/1981 | Wilkes | 60/39.06 |

FOREIGN PATENT DOCUMENTS

| | | | |
|---|---|---|---|
| 0169431 | 1/1986 | European Pat. Off. | |
| 0281961 | 9/1988 | European Pat. Off. | |
| 0173633 | 1/1984 | Japan | |
| 0147035 | 2/1985 | Japan | |
| 0185024 | 9/1985 | Japan | |
| 2146425 | 4/1985 | United Kingdom | 60/733 |

Primary Examiner—Richard A. Bertsch
Assistant Examiner—Howard R. Richman
Attorney, Agent, or Firm—Antonelli, Terry, Stout & Kraus

[57] ABSTRACT

A gas turbine combustor and a method of operating the gas turbine combustor, with the gas turbine combustor comprising a combustion sleeve, a combustion sub-chamber disposed at an upstream side of the combustion sleeve and having an air and fuel supply system, and a combustion main chamber disposed on a downstream side of the sub-chamber and having an air and fuel supply system. The combustion sub-chamber and combustion main chamber are formed in such a manner that the start-up of the gas turbine is effected by the hot combustion gas generated in the sub-chamber. The combustion sub-chamber is provided with an inner sleeve protruding from a side wall of the sub-chamber such that a tip of the inner sleeve is located in the vicinity of a downstream end of the sub-chamber, and a fuel nozzle is provided in a tip of the inner sleeve for increasing the fuel-to-air ratio during an initiating period of an increase in the gas turbine rotation speed.

11 Claims, 5 Drawing Sheets

GAS TURBINE COMBUSTOR AND METHODD OF OPERATING THE SAME

BACKGROUND OF THE INVENTION

The present invention relates to a gas turbine combustor and, more particularly, to a gas turbine combustor which is partly of diffusion type and partly of premixed type.

In general, exhaust emissions from a gas turbine combustor contain substances such as NOx, CO, UHC (unburnt hydrocarbon) and the like which are causes of air pollution. Among these noxious substances, NOx is under a strict control by regulations, and various methods have been proposed for reducing emission of NOx. For example, in a method known as wet-type NOx generation reducing method, water or steam is sprayed into a combustor. This method, however, is inevitably accompanied by a reduction in the efficiency of the gas turbine plant. Therefore, in recent years, a method known as dry-type NOx generation reducing method is becoming a major method. In this method, fuel is supplied into a combustor in a plurality of stages so that the combustion load in each stage is reduced and the combustion is conducted with a lean mixture so as to avoid generation of any local hot spots, thus reducing generation of NOx. However, it is not allowed to employ a large number of combustion stages, due to restriction in the design and construction. In general, therefore, so-called two-staged combustors having fuel nozzles at upstream and downstream sides of the combustor are widely used. This type of combustor is disclosed, for example, in Japanese Patent Unexamined Publication No. 56-25622. FIG. 2 shows an example of such a two-staged combustor. Referring to this Figure, the combustor has a cylindrical combustion sleeve 7 which is divided into two sections in the longitudinal direction thereof so as to define a sub-chamber 1 which is formed in an upstream side (left-hand side in FIG. 2) and intended for a first-stage combustion and a main chamber 2 which is formed in a downstream side and intended for a second-stage combustion.

A first-stage fuel nozzle 3 is disposed in a region near the upstream end of the sub-chamber 1. This fuel nozzle 3 is of a diffusion type combustion in which the fuel 30 injected therefrom is diffused in the surrounding air c so as to be combusted with the air c.

An air swirler 4 is disposed at the end 22 of the main chamber 2 of the second stage. The fuel 32 discharged from a second-stage fuel nozzle 5 is premixed with air n within the air swirler 4 so as to perform premixed combustion at the outlet of the air swirler 4.

FIG. 3 is a graph showing the characteristics of generation of NOx both in the diffusion combustion and premixed combustion, wherein the abscissa represents the fuel-to-air ratio and the ordinate represents the NOx content in relative value.

The stoichiometric fuel-to-air ratio for methane gas is 0.058 and the gas turbine combustor is usually operated with a fuel-to-air ratio which is below this stoichiometric value. In single-staged combustors which have been conventionally used in countries where there is no requirement for reduction of NOx emissions, the fuel-to-air ratio at rated operation was in a range of around 0.04. Since the diffusion combustion is partly employed in this system, the NOx characteristic of this system exhibits a tendency such that the change in relative value of NOx content is comparatively small even if the fuel-to-air ratio is changed. Further, as shown in FIG. 3, in the premixed combustion it is a characteristic that the relative value of NOx content is drastically reduced when the fuel-to-air ratio decreases. The conventional combustor designed for reduced NOx emission is a so-called hybrid combustor in which these diffusion and premixed combustions are combined and, in operation thereof, the diffusion combustion alone is used while the load level is still low after the start-up of the gas turbine and the premixed combustion and the diffusion combustion are simultaneously used in the load range between a light load and a rated load. In FIG. 3, the flame in the sub-chamber 1 is the diffusion combustion flame, while the flame in the main chamber 2 is the premixed combustion flame. Conventional hybrid combustor employs an internal air flow rate control mechanism as indicated by IFC in FIG. 3 for the purpose of controlling the fuel-to-air ratio, in order to expand the region of the premixed combustion flame in the main chamber. In the past, regulations relating NOx reduction were not so strict, so that a simple two-staged combustion with a mere addition of premixed combustion zone (fuel flame $F_2$) could satisfy such regulations. In recent years, however, the regulations relating to NOx reduction are becoming stricter and, to meet such a demand, it has become necessary to effectively reduce generation of NOx also in the first stage, i.e., in the diffusion combustion zone (fuel flame $F_1$). To this end, it has been attempted to reduce generation of NOx by reducing the fuel-to-air ratio in the first stage combustion zone (fuel flame $F_1$) and providing the sub-chamber 1 with an inner sleeve 10 (FIG. 2) so as to expand the diffusion combustion flame and thus increase a contact area of the flame with the air to thereby reduce the flame temperature.

This arrangement, however, presents a new problem relating to the difficulty in maintaining the diffusion combustion flame. FIG. 4 graphically illustrates a characteristic of change in the fuel-to-air ratio relative to the rotational speed of the gas turbine and the level of the load on the gas turbine. More specifically, in FIG. 4, the abscissa represents the rotational speed and the load level, while the ordinate represents the fuel-to-air ratio. Ignition of the fuel is effect when the gas turbine rotational speed is 16% of the rated speed and acceleration of the gas turbine commences after a period of warm-up which usually continues several minutes from the ignition. The fuel-to-air ratio drastically increases and reaches a peak during the acceleration. The fuel-to-air ratio is then progressively decreased and is minimized when the gas turbine has been accelerated to the rated speed under no load.

The fuel-to-air ratio then starts to increase again in accordance with an increase in the load level and is maximized immediately before the rated load is reached. The fuel nozzle 3 for the fuel flame $F_1$ (FIG. 2) is used from the start-up of the gas turbine until the load increases to about 30% of the load under the rated speed, and injects a large amount of the fuel during acceleration of the gas turbine. When a large amount of the fuel is injected, a shortage in oxygen takes place in the region around the fuel nozzle 3 because the space is restricted in this region, so that the flame from the fuel nozzle 3 tends to flameout towards the main chamber having a comparatively large space thereby resulting in the flame being extinguished as a result of contact with cold air. The rotational speed of the gas turbine at which the blow off of the flame takes place has a certain relationship to the temperature of the air discharged from the gas turbine and, the flameout or flame extinguishing is retarded as the air temperature is raised.

FIG. 5 graphically illustrates a relationship between fuel flow rate (ordinate) and gas turbine rotation speed (abscissa). In FIG. 5, a gas turbine operation curve represents the state of operation of the gas turbine as determined by the gas turbine rotational speed and the fuel flow rate. A mark X on this curve represents a flameout point. In the illustrated case, the flameout takes place when the rotation speed is comparatively low. A curve representing the upper limit against the flameout is obtained by connecting a plurality of flameout points. Similarly, there is a curve representing the lower limit against blow off of the flame. Therefore, in the start-up of the gas turbine it is necessary that the gas turbine combustor be operated under conditions which fall within the range between the curves representing the upper and lower flameout limits but this makes it impossible to increase an incremental ratio of the fuel flow rate, so that it takes the fifteen to twenty minutes for the gas turbine to be started and reach the rated speed under no load.

Thus, while the conventional constructions mentioned above are effective for reducing the NOx generation, with respect to the quick start-up of the gas turbine, the conventional approach is disadvantageous in that, during the start-up of the turbine, the flameout takes place or a very long time is required until the rated rotational speed is reached although there is no flameout.

SUMMARY OF THE INVENTION

Accordingly, an object of the present invention is to provide a gas turbine combustor which enables a gas turbine to be started up in a desired short time.

Another object of the present invention is to provide a gas turbine combustor which can effectively stabilize the diffusion flame during start-up.

Still another object of the present invention is to provide a method of operating a gas turbine combustor which enables the gas turbine to be started up in a short time.

To this end, according to the present invention, there is provided a gas turbine combustor comprising a combustion sleeve, a combustion sub-chamber disposed at an upstream side of the combustion sleeve and having an air and fuel supply system, and a combustion main chamber disposed on a downstream side of the sub-chamber and having an air and fuel supply system, and formed in such a manner that the start-up of the gas turbine is effected by the hot combustion gas generated in the sub-chamber. A fuel nozzle is provided in the sub-chamber for injecting the fuel during a change in the gas turbine rotational speed.

By virtue of the features of the present invention, it is unnecessary to increase the flow rate of the fuel supplied to the nozzle for the combustion in the sub-chamber even during start-up acceleration of the gas turbine. Thus, the combustion in the sub-chamber depending on the fuel-to-air ratio rush into never reaches the flameout region, so that the expected objects can be achieved.

BRIEF DESCRIPTION OF THE DRAWINGS

FIG. 7b is a front elevational view of the fuel injection nozzle shown in FIG. 7a;

FIG. 8b is a front elevational view of the fuel injection nozzle shown in FIG. 8a.

Figure 1:
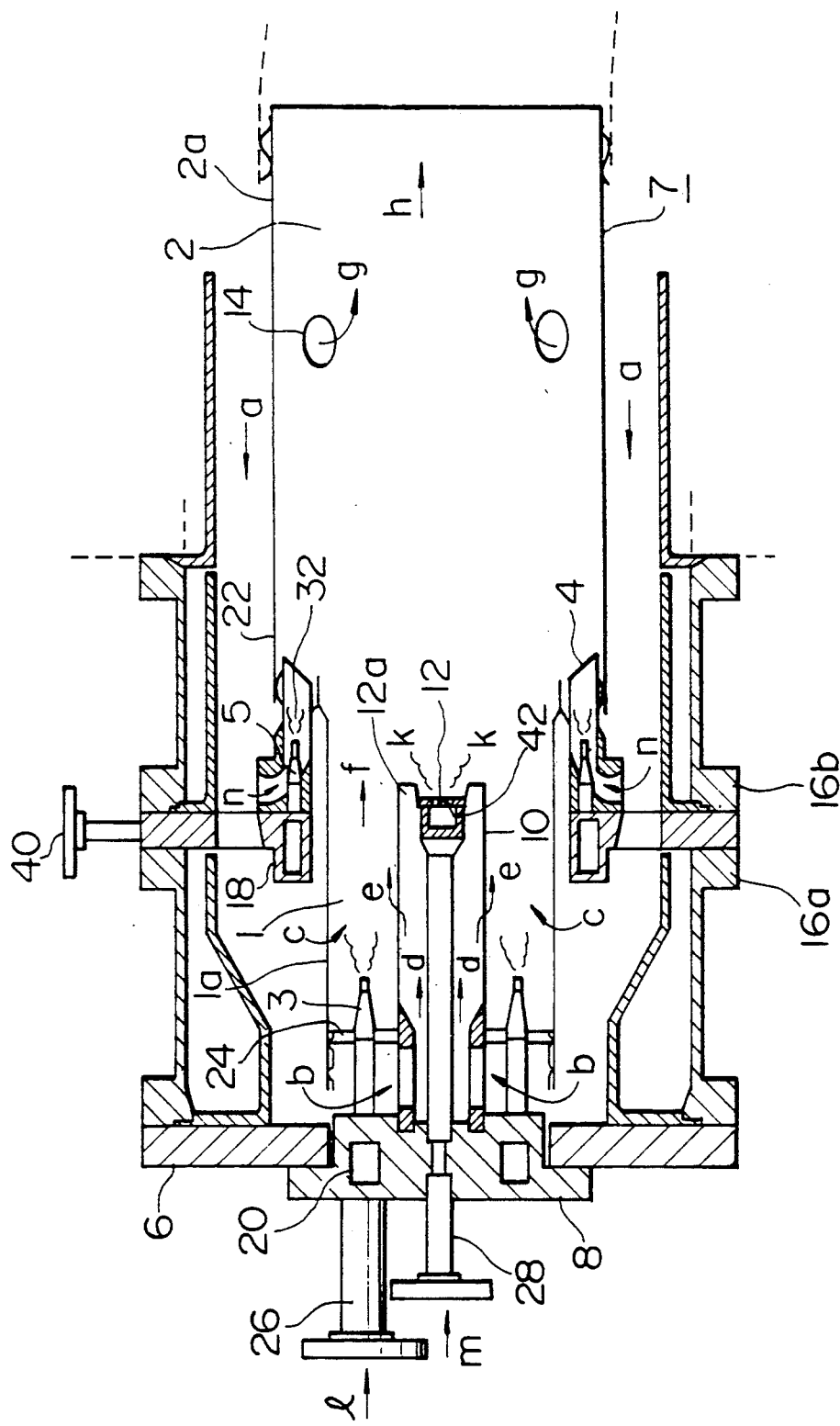
FIG. 1 is a longitudinal sectional view of an embodiment of the gas turbine combustor according to the present invention.
Figure 2:
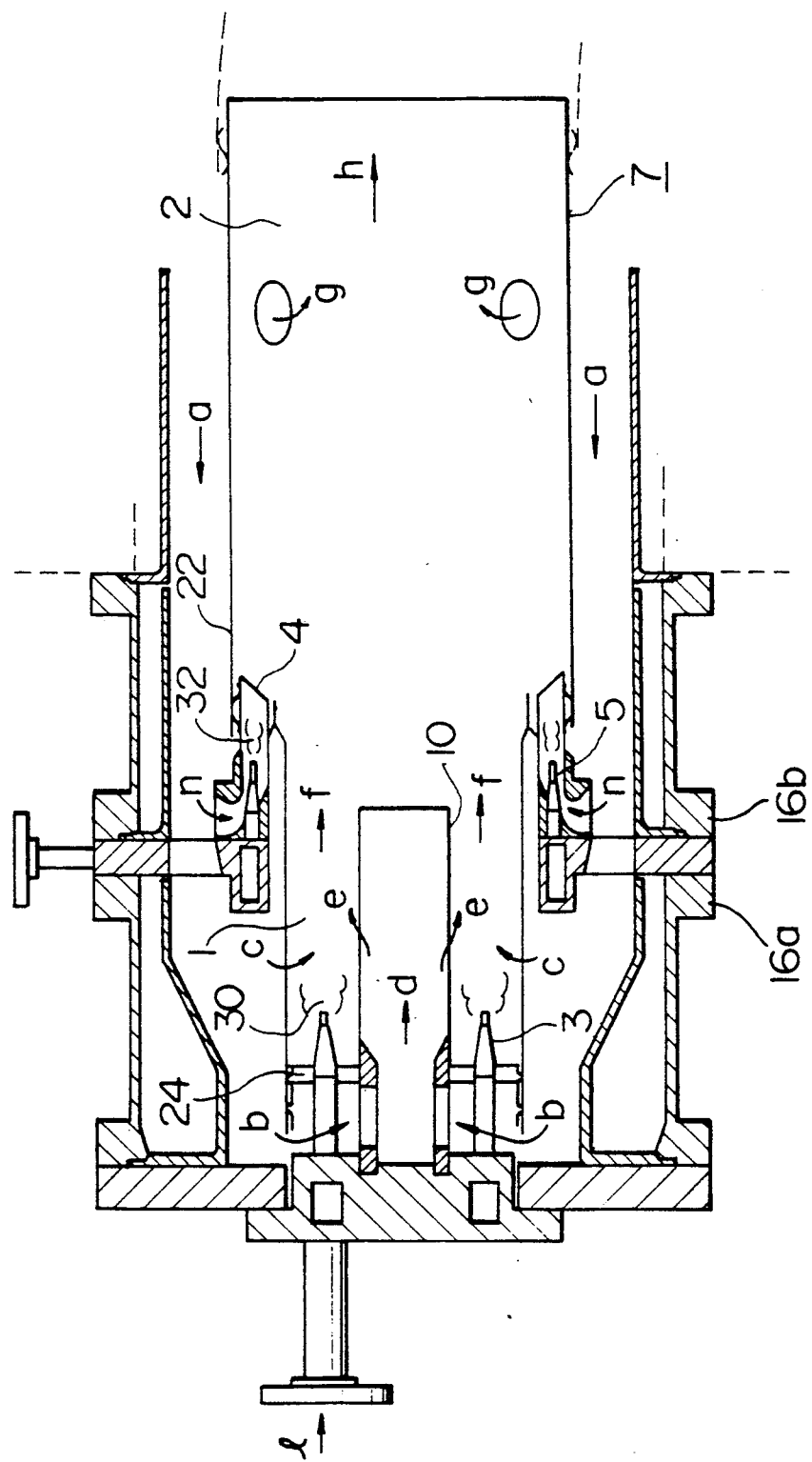
FIG. 2 is a longitudinal sectional view of a conventional gas turbine combustor.
Figure 3:
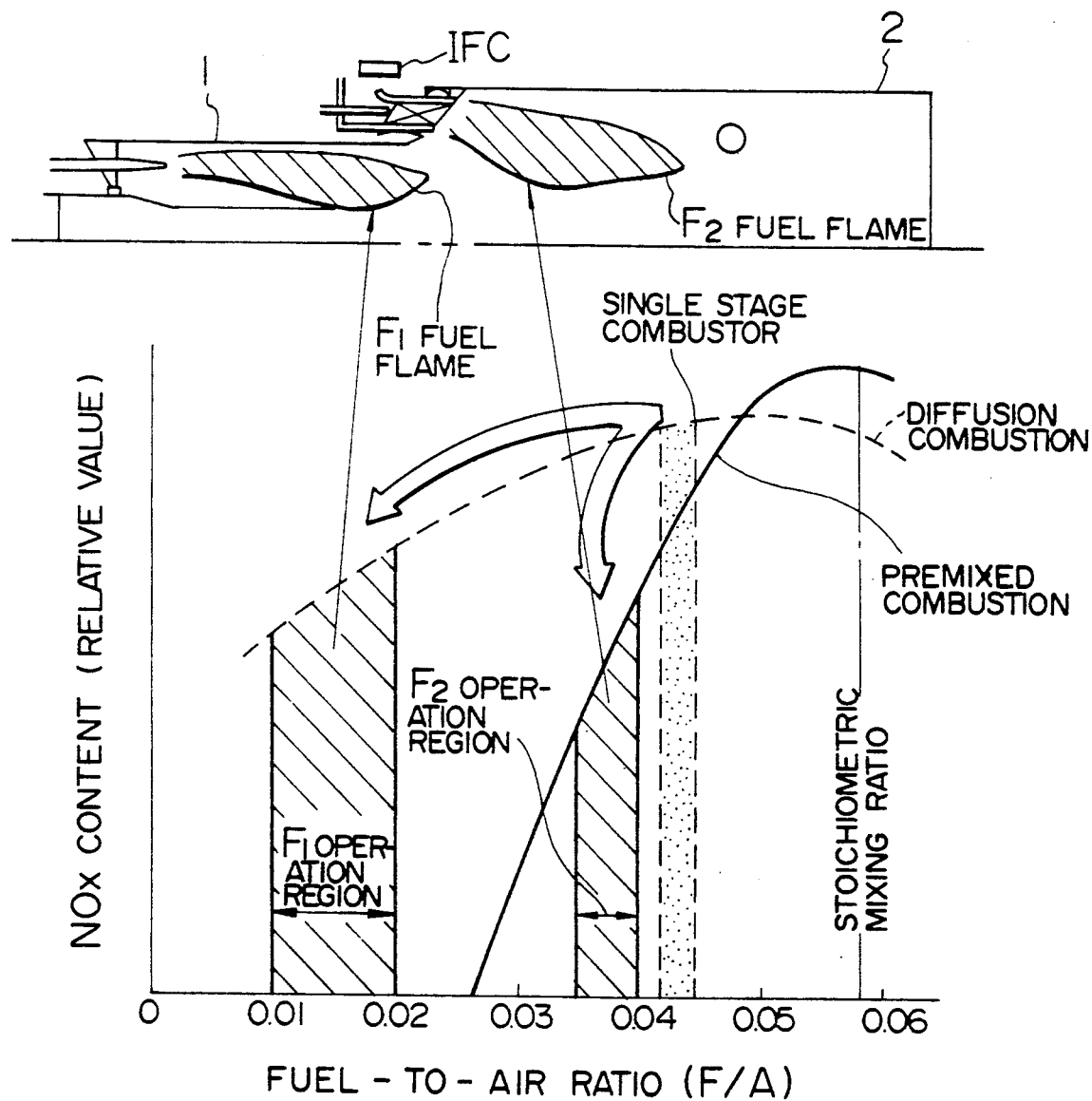
FIG. 3 is a graphical illustration of a relationship between NOx content in exhaust emissions and fuel-to-air ratio of the mixture combustion in the gas turbine combustor.
Figure 4:
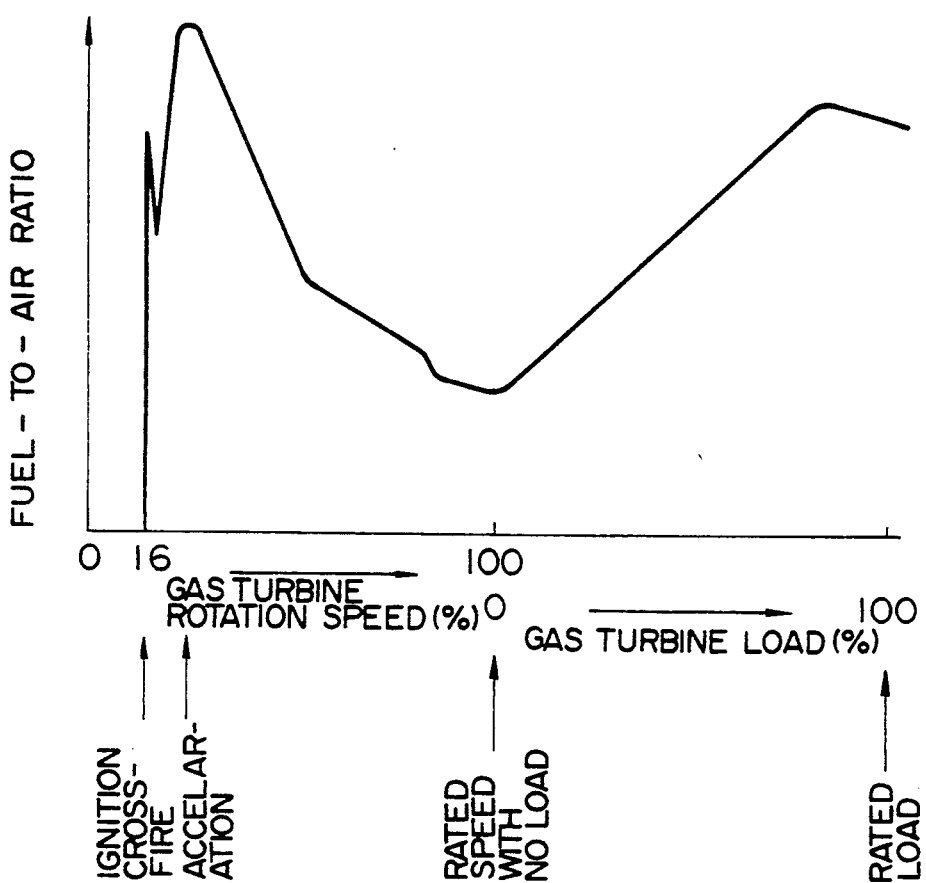
FIG. 4 is a graphical illustration of a relationship between fuel-to-air ratio and the gas turbine rotational speed.
Figure 5:
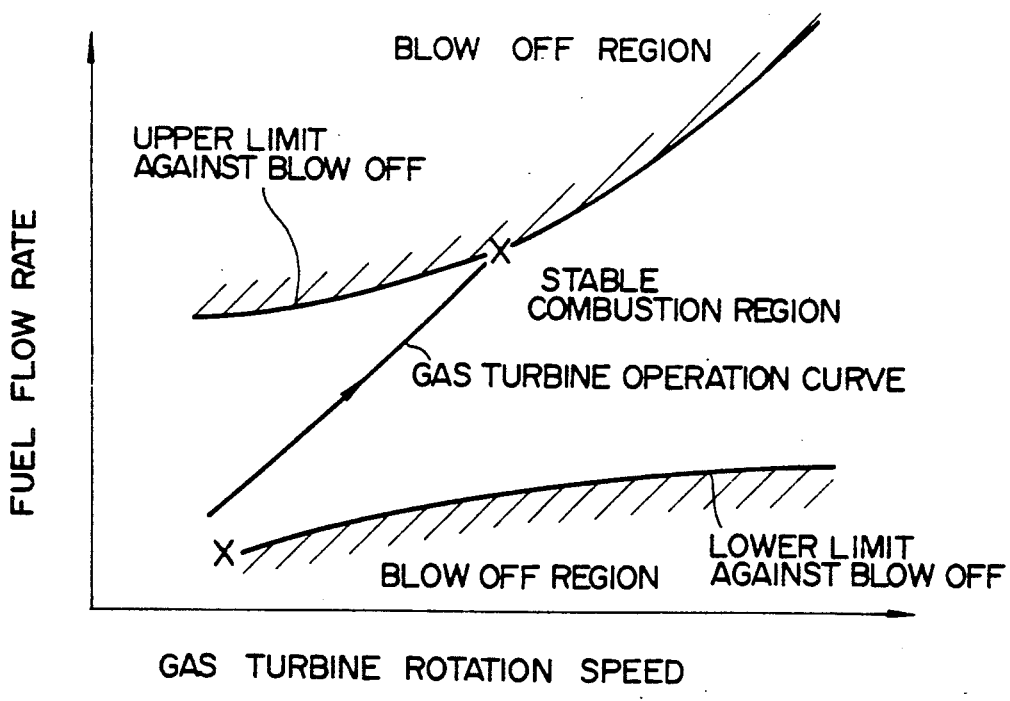
FIG. 5 is a graphical illustration of the relationship between flow rate of a fuel and the gas turbine rotational speed.

Referring now to the drawings wherein like reference numerals are used throughout the various views to designate like parts and, more particularly, to FIG. 1, a combustor for a gas turbine according to the present invention includes a combustion sleeve 7, outer cylinders 16a and 16b surrounding the combustion sleeve 7, an end cover 6, a main chamber wall 2a forming a combustion main chamber 2, a sub-chamber wall 1a forming a combustion sub-chamber 1, fuel nozzle 3 for the fuel flame $F_1$ disposed at an upstream side (left-hand side in FIG. 1) of the sub-chamber 1, and a fuel nozzle 5 the fuel flame $F_2$ disposed at an upstream side of the main chamber 2.

The sub-chamber 1, formed at an upstream side of the combustion sleeve 7, has a diameter less than a diameter of the main chamber 2 disposed in its downstream side and is used for burning a fuel for the fuel flame $F_1$ supplied to an upstream side of the sub-chamber 1. The main chamber 2 disposed at a downstream side of the combustion sleeve 7 has a diameter greater than a diameter of the sub-chamber 1 and is used for buring fuel 32 for the fuel flame $F_2$ supplied from a downstream side of the sub-chamber 1 (upstream side of the main chamber 2) and combustible substances such as CO, etc. which remained uncombusted in the sub-chamber 1. The main chamber 2 is provided at its downstream side with diluting air ports 14 which allow air g to flow into the main chamber 2 to thereby lower the temperature of the combustion gas h to a predetermined level. The gas turbine combustor of the present invention employs a three-staged fuel supply system; namely, nozzle 3 for combustion mainly in the sub-chamber 1, the fuel nozzle 5 for combustion in the main chamber 2, and fuel nozzle 12 for the fuel flame $F_s$ used during start-up of the gas turbine. The supply of air to the fuel nozzle 3 is conducted as indicated by arrows a and c, while the supply of air to the fuel nozzle 5 is conducted as indicated by arrows a and n. The supply of air to the fuel nozzle 12 is conducted as indicated by arrows a, b, d and e. In general, the fuel nozzles 3 are individually inserted into the sub-chamber 2 through the end cover 6, while a plurality of fuel nozzles 5 are fixed to a joint portion between the sub-chamber 1 and the main chamber 2 while being arranged at a suitable circumferential pitch. An air swirler 4 is disposed in the space between the main chamber 2 and the sub-chamber 1, and a fuel reservoir tube 18 is connected to upstream side of the air swirler 4. The fuel reservoir tube 18 is supplied with the fuel through an external fuel supply tube 40. A plurality of fuel nozzles 5 in the downstream side of the fuel reservoir tube 18 are arranged at a suitable circumferential pitch while protruding or extending into the air swirler 4. An inner sleeve 10 is disposed coaxially with the sub-chamber 1. The fuel nozzle 12 is disposed on the downstream end of the inner sleeve 10 coaxially therewith. The fuel nozzle 12 injects the fuel at a region which is slightly upstream of the fuel nozzle 5. The supply of the fuel to the fuel nozzle 12 is conducted through a fuel supply system which is independent from the fuel supply systems for the fuel nozzles 3, 5.

A sleeve 12a is disposed on the peripheral edge of the fuel nozzle 12 so as to protrude into the downstream side, thereby eliminating any influence of external turbulence and thus providing a recess for maintaining the flame.

As shown in FIG. 1, the gas turbine combustor further has a nozzle support plate 8, a fuel distribution groove 20 for the fuel flame $F_1$, an air distribution plate 24, a fuel supply tube 26 for the fuel flame $F_1$, and fuel supply tube 28 for the fuel flame $F_s$.

Figure 6:
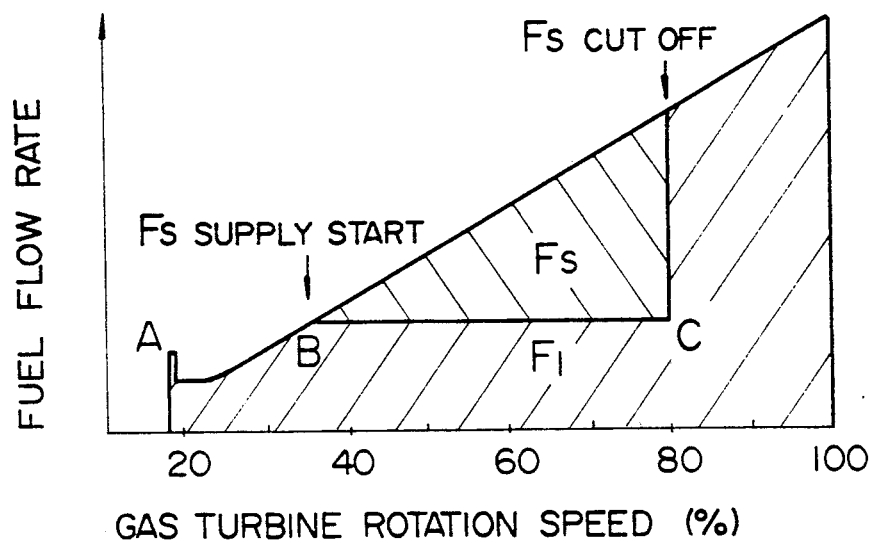
FIG. 6 is a graphical illustration of the relationship between flow rate of a fuel and the gas turbine rotational speed.

The fuel nozzle 12 is operated during start-up of the gas turbine, with FIG. 6 showing a pattern of supply of the fuel. When the gas turbine is started, the fuel l (FIG. 1) for the fuel flame $F_1$ is supplied and ignited to effect a cross-fire (point A). Then, the flow rate of the fuel for the fuel flame $F_1$ is progressively increased, and when the flow rate approaches a flow rate corresponding to the upper limit of a flameout the flow rate of the fuel l is maintained constant and, at the same time, the supply of the fuel m (FIG. 1) for the fuel flame $F_s$ commences (point B). As a result of the combustions with fuel from the fuel nozzles 3, 12, the gas turbine is accelerated to a rotational speed at which the temperature of the combustion air supplied from a compressor into the combustor is high enough to maintain the operation of the gas turbine by the combustion of fuel supplied only by the fuel nozzle 3. When such a rotational speed is reached, the flow rate of the fuel l is increased and the flow rate of the fuel m is reduced (point C). The flow rate of the fuel m is reduced to zero before the gas turbine under no load is accelerated to the rated speed.

Figure 7A:
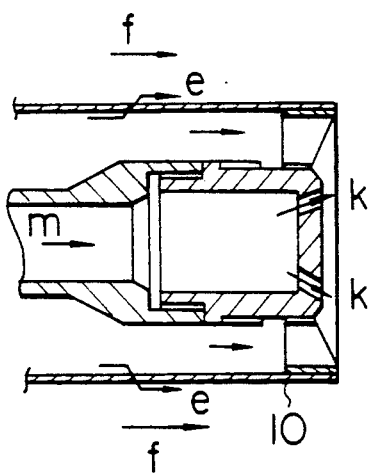
FIG. 7a is a longitudinal sectional view of an example of a fuel injection nozzle.
Figure 7B:
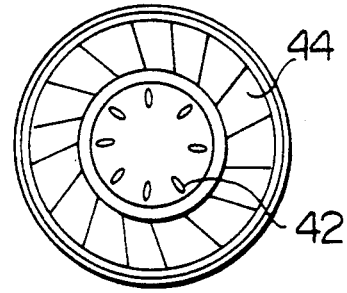

FIGS. 7a and 7b illustrate the detail of an example of the construction of the $F_s$ fuel nozzle 12. This nozzle 12 is provided, as means for improving an ability to hold flame, with an air swirler 44 surrounding a nozzle tip 42 having eight fuel injection ports. The outside diameter of the air swirler 44 is selected such that the air swirler 44 just fits in the inner sleeve 10. The fuel gas is supplied as indicated by the arrow m and injected at a certain angle to the axis of the nozzle 12 as indicated by arrows k. Arrows e indicate the flow of air for cooling the inner sleeve 10, with the air being swirled through the air swirler 44 so as to diffuse and be mixed with the fuel m. The inner sleeve 10 is surrounded by the flow of the combustion gas f formed by the fuel l but the fuel m can maintain a stable flame on the downstream of the air swirler 44 and the nozzle tip 42.

The ignition of the fuel m is performed automatically by the hot combustion gas f from the fuel nozzle 3, when the supply of the fuel m commences.

Figure 8A:
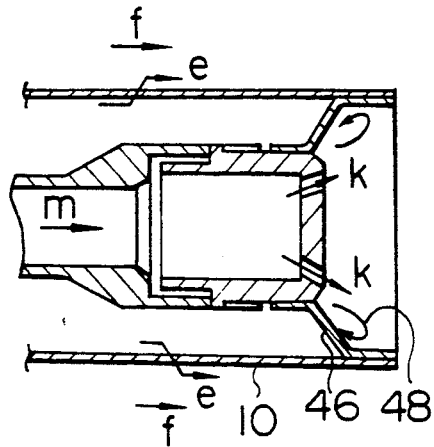
FIG. 8a is a longitudinal sectional view of another example of a fuel injection nozzle.
Figure 8B:
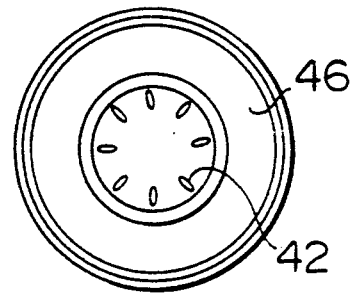

FIGS. 8a and 8b show another example of the fuel nozzle 12 which improves an ability to hold flame. In this fuel nozzle 12, instead of the air swirler 44, a baffle sleeve 46 is provided so as to fit in the inner sleeve 10, thereby forming a stable flame of the fuel m independently of the hot combustion gas f which is formed by the fuel and which surrounds the nozzle 12. Particularly, since small vortices 48 are formed on the outer peripheral side of the baffle 46, the vortices 48 serve as igniting fire which continuously ignites the fuel k injected from the fuel nozzle 12.

As has been described above, in the gas turbine combustor of the present invention, since the combustion sub-chamber is provided with an inner sleeve extending from the upstream side wall of the sub-chamber toward the downstream side thereof and a fuel nozzle is further provided in the downstream side tip of the inner sleeve for injecting the fuel during a change in rotational speed of the gas turbine, it becomes unnecessary even during start-up acceleration of the gas turbine to increase a flow rate of the fuel supplied to a fuel nozzle for combustion in the sub-chamber, i.e. the combustion in the sub-chamber depending on the fuel-to-air ratio does not reach the flameout region, so that it becomes possible to stably maintain the flame in the sub-chamber and to start up the gas turbine in a short time period.

What is claimed is:

1. A method of operating a gas turbine combustor comprising a combustion sleeve, a combustion sub-chamber disposed at an upstream side of said combustion sleeve and having a first air and fuel supply system, a combustion main chamber disposed on a downstream side of said sub-chamber and having a second air and fuel supply system, the method comprising the steps of:
    driving and accelerating the gas turbine during a start-up by hot combustion gas generated in said sub-chamber by a first fuel nozzle connected to the first air and fuel supply system and during a load operation of the gas turbine by hot combustion gas generated in said main chamber, and
    supplying fuel to a downstream side of said sub-chamber during the start-up of the gas turbine by a second fuel nozzle having a second air and fuel supply system.

2. A method of operating a gas turbine combustor comprising a combustion sleeve, a combustion sub-chamber disposed at an upstream side of said combustion sleeve and having a first air and fuel supply system and a first fuel nozzle, a combustion main chamber disposed in a downstream side of said sub-chamber and having a second air and fuel supply system, the method comprising the steps of:
    driving and accelerating the gas turbine during the start-up of the gas turbine by hot combustion gas generated in said sub-chamber by the first fuel nozzle connected to the first air and fuel supply system and during a load operation of the gas turbine by hot combustion gas generated in said main chamber; and
    injecting a predetermined amount of fuel by a second fuel nozzle having a third air and fuel supply system toward a zone in a vicinity of a downstream end of said sub-chamber during acceleration of the gas turbine so as to maintain a fuel-to-air ratio in said sub-chamber at a predetermined value.

3. A method of operating a gas turbine combustor according to claim 2, wherein the step of injection of the fuel is effected during a time period in which a rotational speed of the gas turbine is within a range of 20 to 60% of a rated speed.

4. A combustor for a gas turbine comprising a combustion sleeve, a combustion sub-chamber disposed at an upstream side of said combustion sleeve and having an air and fuel supply system and a first fuel nozzle, and a combustion main chamber disposed at a downstream side of said sub-chamber and having an air and fuel supply system and a second fuel nozzle, said combustion sub-chamber and said combustion main chamber being arranged in such a manner that a start-up of the gas turbine is effected by the hot combustion gas generated in said sub-chamber, an inner sleeve provided in said combustion sub-chamber and protruding from a side wall of said sub-chamber such that a tip of said sleeve is located in a vicinity of a downstream end of said sub-chamber, and a third fuel nozzle provided in the tip of said sleeve for increasing a fuel-to-air ratio during an initiating period of an increase in a rotational speed of the gas turbine.

5. A combustor for a gas turbine according to claim 4, wherein means are provided for controlling a fuel flow rate of said third fuel nozzle as a function of the rotational speed of the gas turbine.

6. A combustor for a gas turbine according to one of claims 4 or 5, wherein said third fuel nozzle is adapted to inject the fuel in a downstream direction, and wherein a baffle sleeve is provided on a periphery of said nozzle so as to protrude in the downstream direction from an end face of said fuel nozzle.

7. A combustor for a gas turbine comprising a combustion sleeve, a combustion sub-chamber disposed at an upstream side of said combustion sleeve and having a first air and fuel supply system and a first fuel nozzle connected to the first air and fuel system, and a combustion main chamber disposed at a downstream side of said sub-chamber for combusting therein any uncombusted combustible gas remaining in said sub-chamber and having a second fuel nozzle, an inner sleeve is provided in said sub-chamber and extending from an upstream end wall of said sub-chamber toward a downstream side thereof, and a third fuel nozzle provided in a downstream tip of said inner sleeve for injecting fuel during a change in rotational speed of the gas turbine and having a second air and fuel supply system.

8. A combustor for a gas turbine comprising a combustion sleeve, a combustion sub-chamber disposed at an upstream side of said combustion sleeve and having a first air and fuel supply system and a first fuel nozzle connected to the first air and fuel supply system, a combustion main chamber disposed at a downstream side of said sub-chamber for combusting therein any uncombusted combustible gas remaining in said sub-chamber and having a second fuel nozzle, an inner sleeve is provided in said sub-chamber and extending into a combustion space of said sub-chamber, and a third fuel nozzle provided at a downstream end face of said inner sleeve for injecting fuel during a change in a load of the gas turbine, said third fuel nozzle having a second air and fuel supply system.

9. A combustor for a gas turbine comprising a combustion sleeve, a combustion sub-chamber disposed at an upstream side of said combustion sleeve and having a first air and fuel supply system and a first fuel nozzle connected to the first air and fuel supply system, a combustion main chamber disposed at a downstream side of said sub-chamber for combusting therein any uncombusted combustible gas remaining in said sub-chamber and having a second fuel nozzle, an inner sleeve is provided in said sub-chamber and extending into a combustion space of said sub-chamber, and a third fuel nozzle is provided in a tip face of said inner sleeve for increasing a fuel-to-air ratio in said sub-chamber, said third nozzle having a second air and fuel supply system.

10. A combustor for a gas turbine comprising a combustion sleeve, a combustion sub-chamber disposed at an upstream side of said combustion sleeve and having a first air and fuel supply system and a first fuel nozzle connected to said first air and fuel supply system, a combustion main chamber disposed at a downstream side of said sub-chamber and having a second air and fuel supply system and a second fuel nozzle connected to said second air and fuel supply system, said combustion sub-chamber and said combustion main chamber being arranged in such a manner that a start-up of the gas turbine is effected by hot combustion gas generated in said sub-chamber, and a third fuel nozzle is provided in said sub-chamber for injecting fuel during an increase in a rotational speed of the gas turbine, said third fuel nozzle having a third air and fuel supply system.

11. A combustor for a gas turbine comprising a combustion sleeve, a combustion sub-chamber disposed at an upstream side of said combustion sleeve and having a first air and fuel supply system and a first fuel nozzle connected to the first air and fuel supply system, a combustion main chamber disposed at a downstream side of said sub-chamber and having a second air and fuel supply system and a second fuel nozzle connected to said second air and fuel supply system, said combustion sub-chamber and said combustion main-chamber being arranged in such a manner that a start-up of the gas turbine is effected by the hot combustion gas generated in said sub-chamber, a third fuel nozzle is provided in said sub-chamber for injecting fuel during a time period in which a rotational speed of the gas turbine, when accelerated, is 20 to 60% of a rated speed, said third fuel nozzle having a third air and fuel supply system.

* * * * *